(12) United States Patent
Dureau

(10) Patent No.: US 9,386,264 B2
(45) Date of Patent: Jul. 5, 2016

(54) AUGMENTING CAPABILITIES OF A HOST DEVICE

(71) Applicant: GOOGLE INC., Mountain View, CA (US)

(72) Inventor: Vincent Dureau, San Francisco, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

(21) Appl. No.: 14/614,366

(22) Filed: Feb. 4, 2015

(65) Prior Publication Data

US 2015/0181156 A1  Jun. 25, 2015

Related U.S. Application Data

(63) Continuation of application No. 13/598,530, filed on Aug. 29, 2012, now Pat. No. 8,984,186.

(51) Int. Cl.
*G06F 3/00* (2006.01)
*G06F 13/38* (2006.01)
(Continued)

(52) U.S. Cl.
CPC .............. *H04N 7/002* (2013.01); *G06F 9/5044* (2013.01); *G06F 9/5055* (2013.01); *H04N 5/4403* (2013.01); *H04N 21/25833* (2013.01); *H04N 21/25858* (2013.01); *H04N 21/4104* (2013.01); *H04N 21/4108* (2013.01); *H04N 21/42204* (2013.01); *H04N 21/436* (2013.01);
(Continued)

(58) Field of Classification Search
None
See application file for complete search history.

(56) References Cited

U.S. PATENT DOCUMENTS 6,141,705 A * 10/2000 Anand ................... G06F 9/5044
709/203
6,418,555 B2 * 7/2002 Mohammed .............. G06F 8/65
710/8
(Continued)

FOREIGN PATENT DOCUMENTS

CN         1453715 A      11/2003
CN       102362241 A       2/2012
(Continued)

OTHER PUBLICATIONS

Google Inc., International Search Report and Written Opinion, PCT/US2013/057372, Dec. 5, 2013, 10 pgs.
(Continued)

*Primary Examiner* — Michael Sun
(74) *Attorney, Agent, or Firm* — Morgan, Lewis & Bockius LLP

(57) ABSTRACT

A system, computer-readable storage medium storing at least one program, and a computer-implemented method for augmenting capabilities of a host device is presented. A first application on the host device is executed, where the first application is configured to execute on a second device and is configured to use a capability that is available on the second device, and where the capability is not included in the host device. A request is received from the first application to use the capability that is available the second device, where the first application does not have knowledge of the capabilities of the second device. A connection is established to the second device through at least one network. Communications are facilitated between the first application and the second device though the at least one network to provide the capability that is available on the second device to the first application.

20 Claims, 9 Drawing Sheets

(51) Int. Cl.
*G06F 15/177* (2006.01)
*H04N 7/00* (2011.01)
*G06F 9/50* (2006.01)
*H04N 5/44* (2011.01)
*H04N 21/41* (2011.01)
*H04N 21/422* (2011.01)
*H04N 21/258* (2011.01)
*H04N 21/436* (2011.01)
*H04N 21/443* (2011.01)
*H04N 21/478* (2011.01)
*H04N 21/485* (2011.01)
*H04N 21/654* (2011.01)
*H04N 21/658* (2011.01)

(52) U.S. Cl.
CPC ........... *H04N21/443* (2013.01); *H04N 21/478* (2013.01); *H04N 21/485* (2013.01); *H04N 21/654* (2013.01); *H04N 21/6581* (2013.01)

(56) References Cited

U.S. PATENT DOCUMENTS

| | | | | |
|---|---|---|---|---|
| 7,043,572 | B2* | 5/2006 | Shapiro | H04L 67/125 709/217 |
| 8,694,652 | B2* | 4/2014 | Anderson | H04L 12/40052 709/228 |
| 2003/0204597 | A1 | 10/2003 | Arakawa et al. | |
| 2005/0066229 | A1 | 3/2005 | Karaoguz et al. | |
| 2005/0198222 | A1* | 9/2005 | Kohinata | H04L 12/2805 709/220 |
| 2005/0204057 | A1* | 9/2005 | Anderson | H04L 29/06027 709/236 |
| 2007/0083679 | A1* | 4/2007 | Kikuchi | G06F 9/4411 710/8 |
| 2007/0198656 | A1* | 8/2007 | Mazzaferri | G06F 3/1415 709/218 |
| 2007/0243934 | A1* | 10/2007 | Little | G07F 17/32 463/40 |
| 2008/0009344 | A1* | 1/2008 | Graham | G07F 17/32 463/25 |
| 2008/0098100 | A1* | 4/2008 | Zimmerman | H04L 67/06 709/222 |
| 2009/0104954 | A1* | 4/2009 | Weber | G07F 17/32 463/1 |
| 2010/0039373 | A1* | 2/2010 | Braun | G05G 9/047 345/156 |
| 2010/0199290 | A1* | 8/2010 | Kavanaugh | H04N 1/00204 719/327 |

FOREIGN PATENT DOCUMENTS

EP 1205843 A2 5/2002
WO WO 00/23907 4/2000

OTHER PUBLICATIONS

Google Inc., International Preliminary Report on Patentability, PCT/US2013/057372, Mar. 12, 2015, 8 pgs.
Google Inc., Notice to File a Response, KR 2015-7007627, Sep. 4, 2015, 2 pgs.
Google Inc., Notice of Allowance, KR Patent Application 2015-7007627, Jan. 7, 2016, 1 pg.
Google Inc., Notification of First Office Action, CN Patent Application 201380056098.6, Feb. 6, 2016, 8 pgs.

* cited by examiner

AUGMENTING CAPABILITIES OF A HOST DEVICE

RELATED APPLICATION

The present application is a continuation of U.S. Utility patent application Ser. No. 13/598,530, filed Aug. 29, 2012, entitled "Augmenting Capabilities of a Host Device," which is hereby incorporated by reference in its entirety.

TECHNICAL FIELD

The disclosed embodiments relate generally to augmenting capabilities of a host device.

BACKGROUND

Electronic devices typically include a fixed set of native capabilities. For example, a digital television set top box includes the capability to receive and decode digital television signals, but does not include the capability to place a phone call using a cellular phone network. A smart phone includes the capability to place a phone call using a cellular network, but does not include the capability to receive and decode digital television signals. It is desirable to augment the capabilities of a first device with the capabilities of a second device.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

DETAILED DESCRIPTION

The embodiments described herein provide techniques for augmenting capabilities of a host device. In some embodiments, a first application on the host device is executed, where the first application is configured to execute on a second device and is configured to use a capability that is available on the second device, and where the capability is not included in the host device. A request is then received from the first application to use the capability that is available the second device, where the first application does not have knowledge of the capabilities of the second device. A connection is established to the second device through at least one network and communications are facilitated between the first application and the second device though the at least one network to provide the capability that is available on the second device to the first application.

Figure 1:
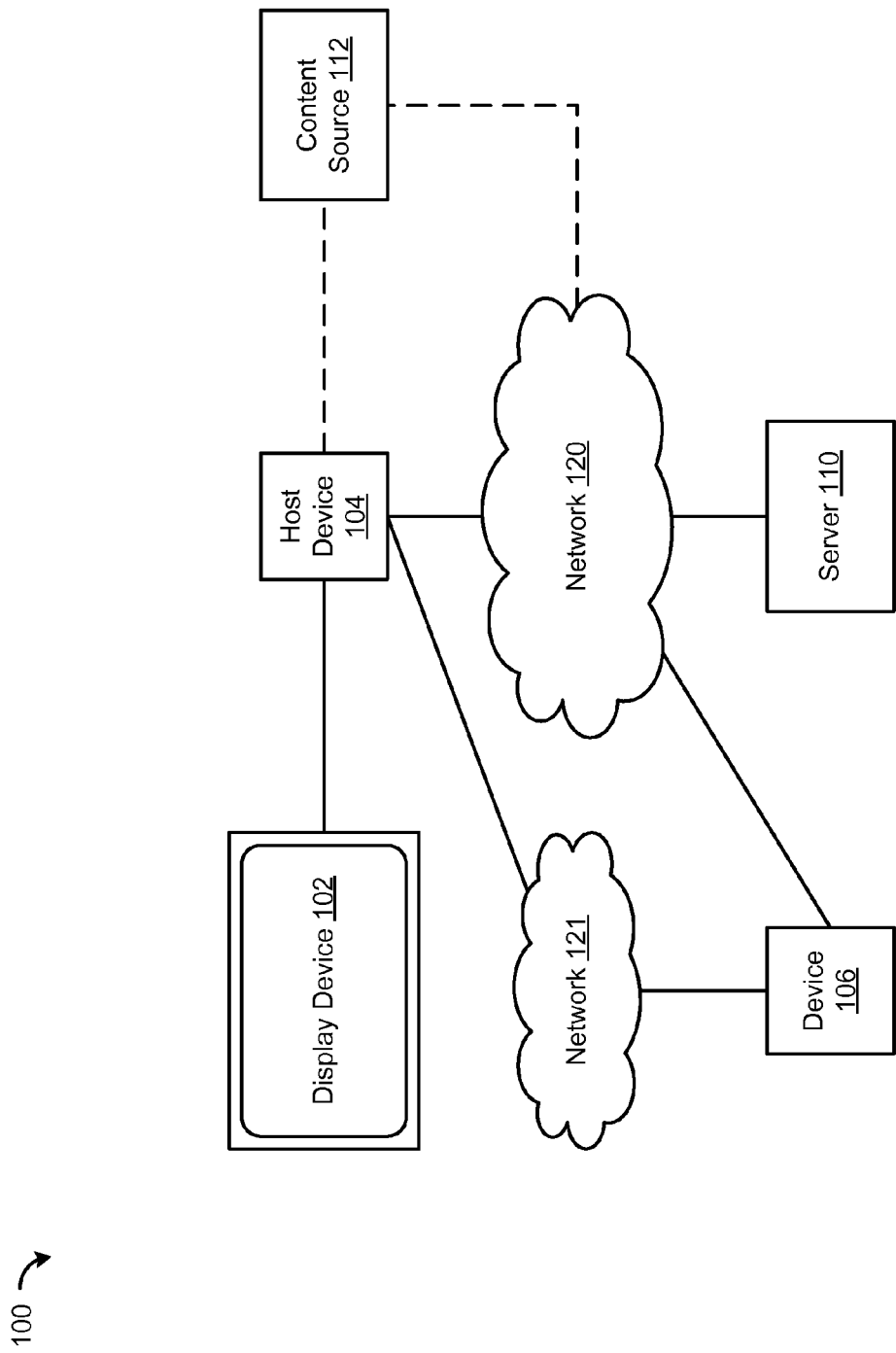
FIG. 1 is a block diagram illustrating a network system, according to some embodiments.

FIG. 1 is a block diagram illustrating a network system 100, according to some embodiments. The network system 100 includes a host device 104 coupled to a display device 102. The host device 104 is configured to display content on the display device 102. The network system 100 includes network 120. Network 120 may generally include any type of wired or wireless communication channel capable of coupling together computing nodes. This includes, but is not limited to, a local area network, a wide area network, or a combination of networks. In some embodiments, network 120 includes the Internet.

In some embodiments, the host device 104 is coupled to a device 106 via network 120. In some embodiments, the host device 104 is coupled to the device 106 via network 121. In these embodiments, network 121 is different than network 120. For example, network 121 may be a local network (e.g., a Wi-Fi network, a Bluetooth network, a cellular network, etc.) and network 120 may be a wide-area network (e.g., the Internet). In some embodiments, the host device 104 is coupled to a server 110.

In some embodiments, the host device 104 includes a computer system. For example, the computer system may include, but is not limited to, a laptop computer system, a desktop computer system, a mobile telephone, a smart phone, a tablet computer system, a personal digital assistant, or a server. In some embodiments, the host device 104 includes a television set top box. In some embodiments, the host device 104 includes a television set. In some embodiments, the host device 104 is coupled to the display device 102 via a network (e.g., a wired network, a wireless network, etc.). In some embodiments, the host device 104 is coupled to the display device 102 via a peripheral cable (e.g., a USB cable, HDMI cable, DVI cable, etc.).

In some embodiments, the device 106 is a computer system. For example, the computer system may include, but is not limited to, a laptop computer system, a desktop computer system, a mobile telephone, a smart phone, a tablet computer system, a personal digital assistant, or a server. In some embodiments, the device 106 includes a television set top box. In some embodiments, the device 106 includes a television set. In some embodiments the device 106 includes television reception or radio reception capability or both. In some embodiments television reception includes but is not limited to reception over cable, satellite, fiber, or broadcast television (radio waves). Radio reception includes but is not limited to reception over radio waves, cable, satellite, or fiber.

In some embodiments, the host device 104 executes applications that are configured to execute on the device 106 and that are configured to use a capability that is available on the device 106, but that is not included (or not available) on the host device 104. In these embodiments, the applications are designed, programmed (e.g., coded), or otherwise configured to be executed on the device 106, but not on the host device 104. Accordingly, the applications can be executed on the device 106, but would otherwise not be executable on the host device 104 without the embodiments described herein. For example, consider a camera application that takes pictures using a built-in camera of a device. Assume that the camera application is configured (designed, programmed, coded, etc.) to be executed on the device 106, which includes a built-in camera, but that the camera application is not configured (designed, programmed, coded, etc.) to be executed on the host device 104, which does not include a built-in camera. Despite the lack of a built-in camera, the embodiments described herein augment the capabilities of the host device 104 and allow the host device 104 to execute the camera application and to utilize the built-in camera of the device 106. Furthermore, the embodiments described herein allow the host device 104 to execute the camera application without modification to the camera application. For example, the camera application may be compiled into bytecode (e.g., JAVA bytecode) that is executed in a virtual machine, the camera application may be written in a scripting language (e.g., TCL, PERL) that is interpreted at runtime, or the camera application compiled to be executable within a particular operating system (e.g., Android OS, Chrome OS, iOS, MacOS, Microsoft Windows, etc.). The process of augmenting the capabilities of a host device is described in more detail below with reference to FIGS. 2A, 2B, 3A, 3B, and 7-9.

In some embodiments, the host device 104 obtains content to be displayed on the display device 102 from the server 110 via network 120. For example, the host device 104 may obtain a video (e.g., movie, television program, etc.) that is hosted on the server 110. Network 120 may generally include any type of wired or wireless communication channel capable of coupling together computing nodes. This includes, but is not limited to, a local area network, a wide area network, or a combination of networks. In some embodiments, network 120 includes the Internet.

In some embodiments, the host device 104 obtains content to be displayed on the display device 102 from a content source 112. The content source 112 includes, but is not limited to, a streaming media service, a video-on-demand service, an over-the-air television service, a cable television service, a satellite television service, and/or an Internet Protocol television service. In some embodiments, the host device 104 is coupled to the content source 112 via network 120. In some embodiments, the host device 104 is coupled to a media device that provides the host device 104 with access to the content source 112 (e.g., via an over-the-air television service, a cable television service, a satellite television service).

Note that although FIG. 1 shows one instance for each of the host device 104, the device 106, the server 110, and the content source 112, multiple host devices, devices, servers, and content sources may be present in the network system 100. Also note that each of the server 110 and the content source 112 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.). Moreover, note that although the embodiments described herein refer to the host device 104, the device 106, the server 110, and the content source 112, the embodiments may be applied to multiple host devices, devices, servers, and content sources.

Figure 2A:
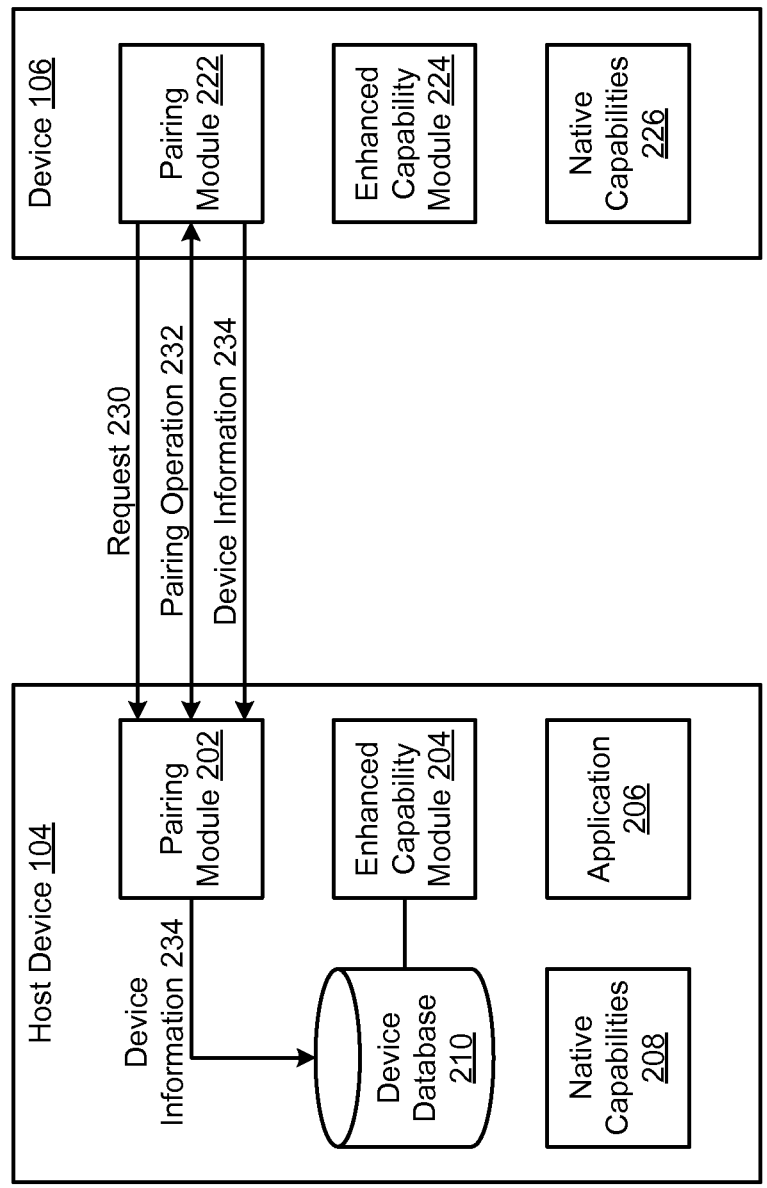
FIG. 2A is a block diagram illustrating an example process of pairing a device with a host device, according to some embodiments.

FIG. 2A is a block diagram 200 illustrating an example process of pairing a device with a host device, according to some embodiments. As illustrated in FIG. 2A, the host device 104 includes a pairing module 202, an enhanced capability module 204, an application 206, native capabilities 208, and a device database 210 The pairing module 202 handles pairing operations between the host device 104 and the device 106 (e.g., operations to pair/associate the host device 104 with the device 106, unpair/dissociate the device 106 from the host device 104, etc.) and facilitates communications between the host device 104 and the device 106. The native capabilities 208 may include hardware capabilities (e.g., sensors, built-in cameras, etc.) and/or software capabilities (e.g., software, applications, widgets, etc.). The application 206 is an application that requires a capability that is not included in the native capabilities 208 of the host device 104, but that is included in the native capabilities 226 of the device 106. The enhanced capability module 204 augments the native capabilities 208 of the host device 104 so that the host device 104 can execute the application 206, as described herein. The device database 210 includes information relating to devices that are currently paired with (or have previously been paired with) the host device 104 and corresponding capabilities of the devices.

The device 106 includes a pairing module 222, an enhanced capability module 224, and native capabilities 226. The pairing module 222 handles pairing operations between the host device 104 and the device 106 (e.g., operations to pair/associate the host device 104 with the device 106, unpair/dissociate the device 106 from the host device 104, etc.) and facilitates communications between the host device 104 and the device 106. The native capabilities 226 may include hardware capabilities (e.g., sensors, built-in cameras, etc.) and/or software capabilities (e.g., software, applications, widgets, etc.). The enhanced capability module 224 facilitates access by other devices to the native capabilities 226 of the device 106.

In the example process illustrated in FIG. 2A, the pairing module 222 of the device 106 issues a request 230 to pair with the host device 104. The pairing module 202 of the host device 104 receives the request 230 and initiates a pairing operation 232 with the device 106. Note that a pairing operation bonds two devices. A pairing operation typically is done the first time the devices are connected with each other. Once two devices have been bonded with each other, the devices can establish connections with each other without having to perform the pairing operation again. Also note that the process of pairing two devices with each other does not imply that an active connection exists between the two devices. For example, the host device 104 and the device 106 may be bonded with each other as a result of a previous pairing operation, but there may not be an active connection between the host device 104 and the device 106 because the device 106 is turned off or out-of-range of the host device 104.

During the pairing operation 232 (or alternatively after the pairing operation 232 has completed), the pairing module 222 transmits device information 234 to the host device 104. The device information 234 includes information relating to the native capabilities 226 of the device 106. The pairing module 202 stores the device information 234 in one or more records in the device database 210 that is associated with the device 106.

Figure 2B:
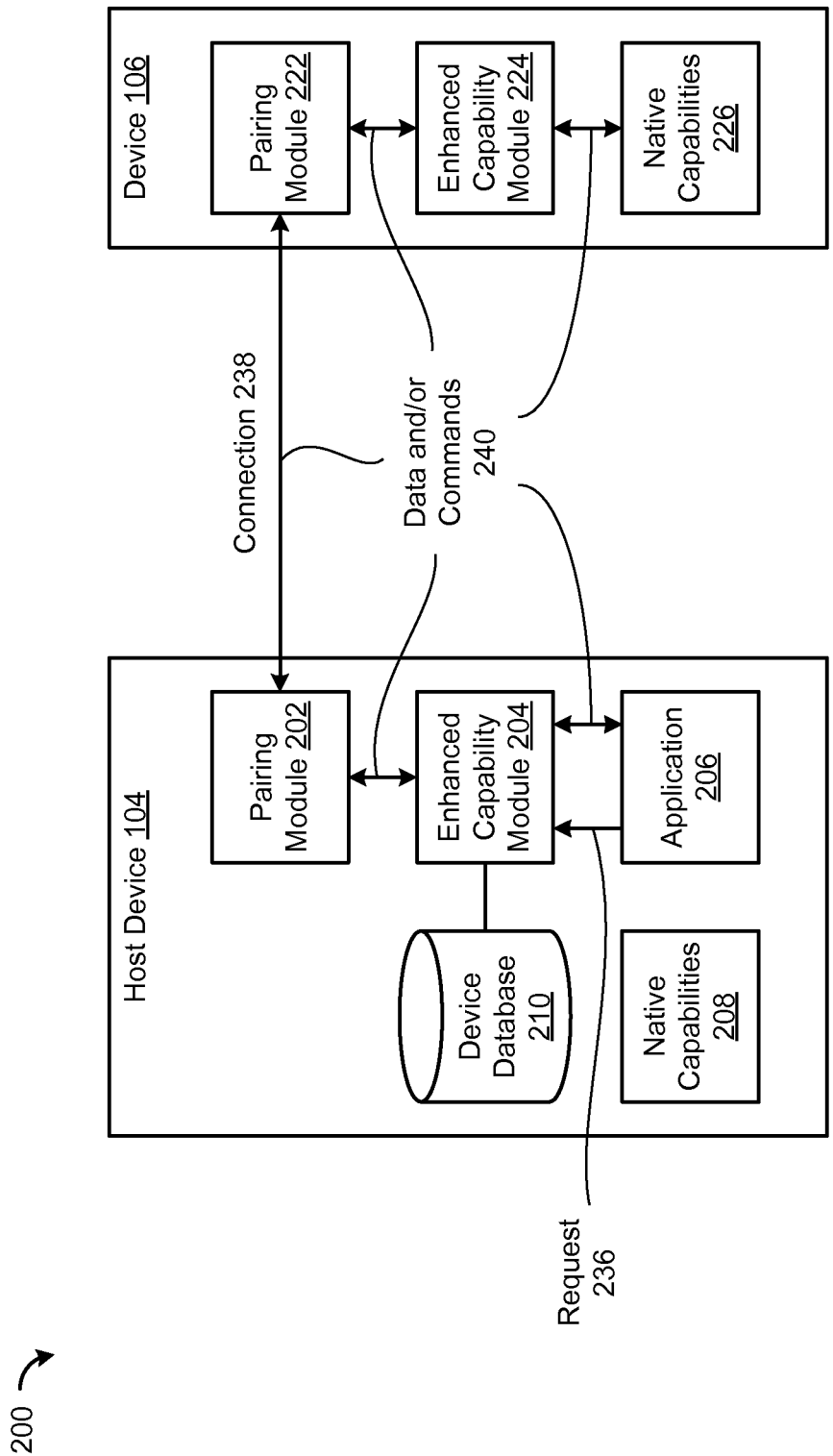
FIG. 2B is a block diagram illustrating an example process of facilitating communication between an application executing on a host device and a capability that is available on a device, according to some embodiments.

As illustrated in FIG. 2B, during execution of the application 206, the enhanced capability module 204 receives a request 236 from the application 206 requesting access to a capability that is not included in the native capabilities 208 of the host device 104. The enhanced capability module 204 queries the device database 210 to determine whether a device that is currently paired with the host device 104 includes the capability that was requested by the application 206. In this example, the enhanced capability module 204 determines that the capability requested by the application 206 is included in the native capabilities 226 of the device 106. Responsive to this determination, the enhanced capability module 204 issues a request to the pairing module 202 to establish a connection 238 to the device 106. The pairing module 202 of the host device 104 and the pairing module 222 of the device 106 establish the connection 238 between the host device 104 and the device 106. The connection 238 may be established using the network 120 and/or the network 121. The pairing modules 202 and 222 facilitate, via the connection 238, communications of data and/or commands 240 between the enhanced capability module 204 of the host device 104 and the enhanced capability module 224 of the device 106. The application 206 uses the connection 238 to accesses the capability of the device 106 that was requested by the application 206. In doing so, the capabilities of the host device 104 are augmented with the capabilities of the device 106.

In the example process illustrated in FIGS. 2A and 2B, the host device 104 and the device 106 are connected to each other through at least one network without any intervening computer systems facilitating the communications between the host device 104 and the device 106. In some embodiments, the server 110 facilitates communications between the host device 104 and the device 110. These embodiments are illustrated in FIGS. 3A and 3B.

Figure 3A:
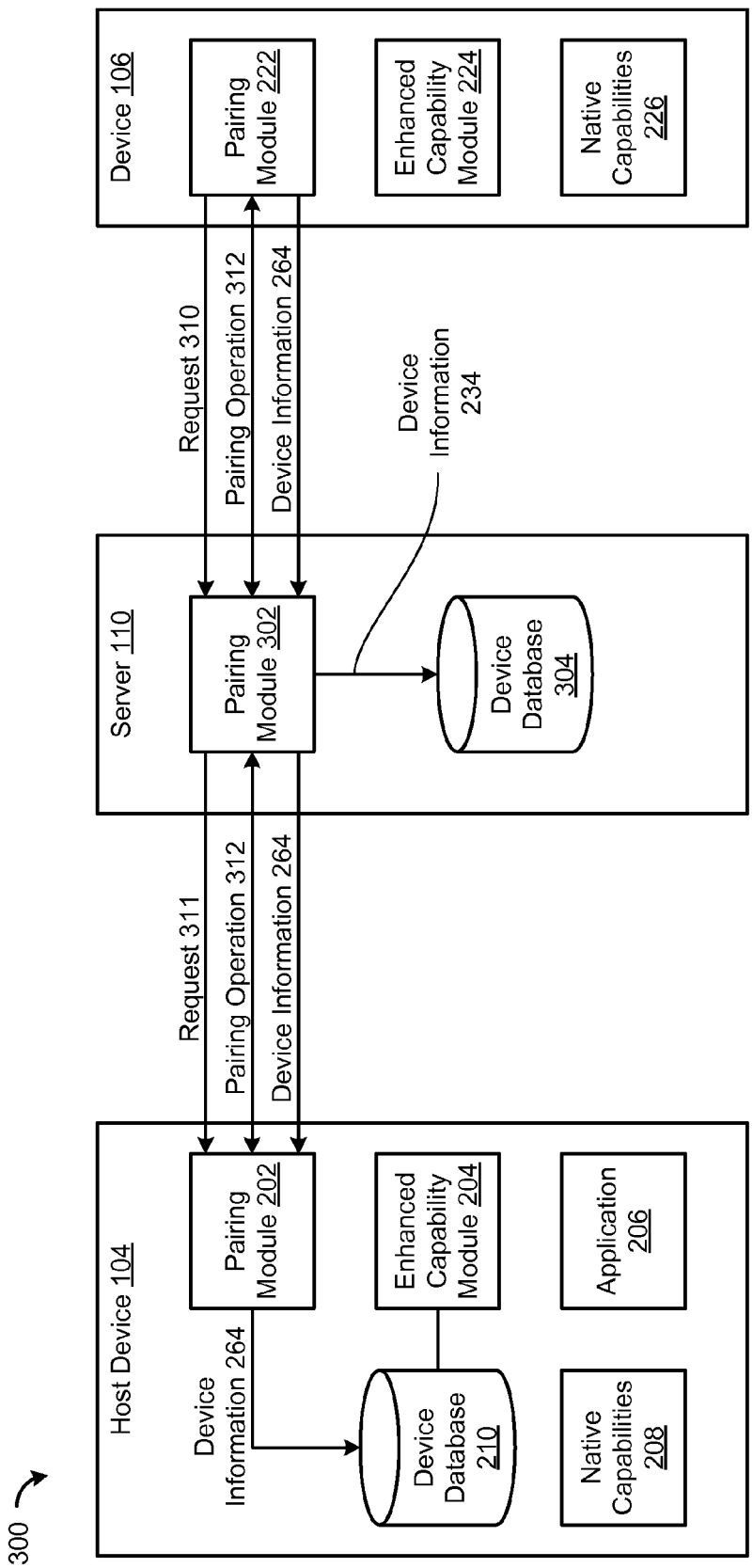
FIG. 3A is a block diagram illustrating an example process of pairing a device with a host device via a server, according to some embodiments.

FIG. 3A is a block diagram 300 illustrating an example process of pairing the device 106 with the host device 104 via the server 110, according to some embodiments. As illustrated in FIG. 3A, the server 110 includes a pairing module 302 and a device database 304 The pairing module 302 facilitates pairing operations between the host device 104 and the device 106 (e.g., operations to pair/associate the host device 104 with the device 106, unpair/dissociate the device 106 from the host device 104, etc.) and facilitates communications between the host device 104 and the device 106. The device database 304 includes information relating to devices that are currently paired with (or have previously been paired with) the host device 104 and corresponding capabilities of the devices. Note that the device database 304 may include information relating to devices that are currently paired with (or have previously been paired with) other host devices and corresponding capabilities of the devices. In other words, the server 110 may facilitate pairing operations and communications between a plurality of host devices and devices.

In the example process illustrated in FIG. 3A, the pairing module 222 of the device 106 issues a request 310 to the server 110 requesting the server 110 to facilitate a pairing operation between the device 106 and the host device 104. The pairing module 302 of the server 110 receives the request 310 and issues a request 311 to the host device 104 requesting that the host device 104 initiate a pairing operation with the device 106 via the server 110. In response to the request 311, the pairing module 202 of the host device 104 initiates a pairing operation 312 with the host device via the server 110. The pairing module 302 of the server 110 facilitates the pairing operation 312 between the host device 104 and the device 106. For example, the pairing module 302 may facilitate (e.g., forward) data and/or commands related to the pairing operation 312 between the host device 104 and the device 106. During the pairing operation 312 (or alternatively after the pairing operation 312 has completed), the pairing module 222 transmits device information 264 to the host device 104 via the server 110. As discussed above, the device information 264 includes information relating to the native capabilities 226 of the device 106. The pairing module 302 of the server 110 stores the device information 264 in one or more records in the device database 304 that is associated with the device 106. Similarly, the pairing module 202 stores the device information 264 in one or more records in the device database 210 that is associated with the device 106.

Figure 3B:
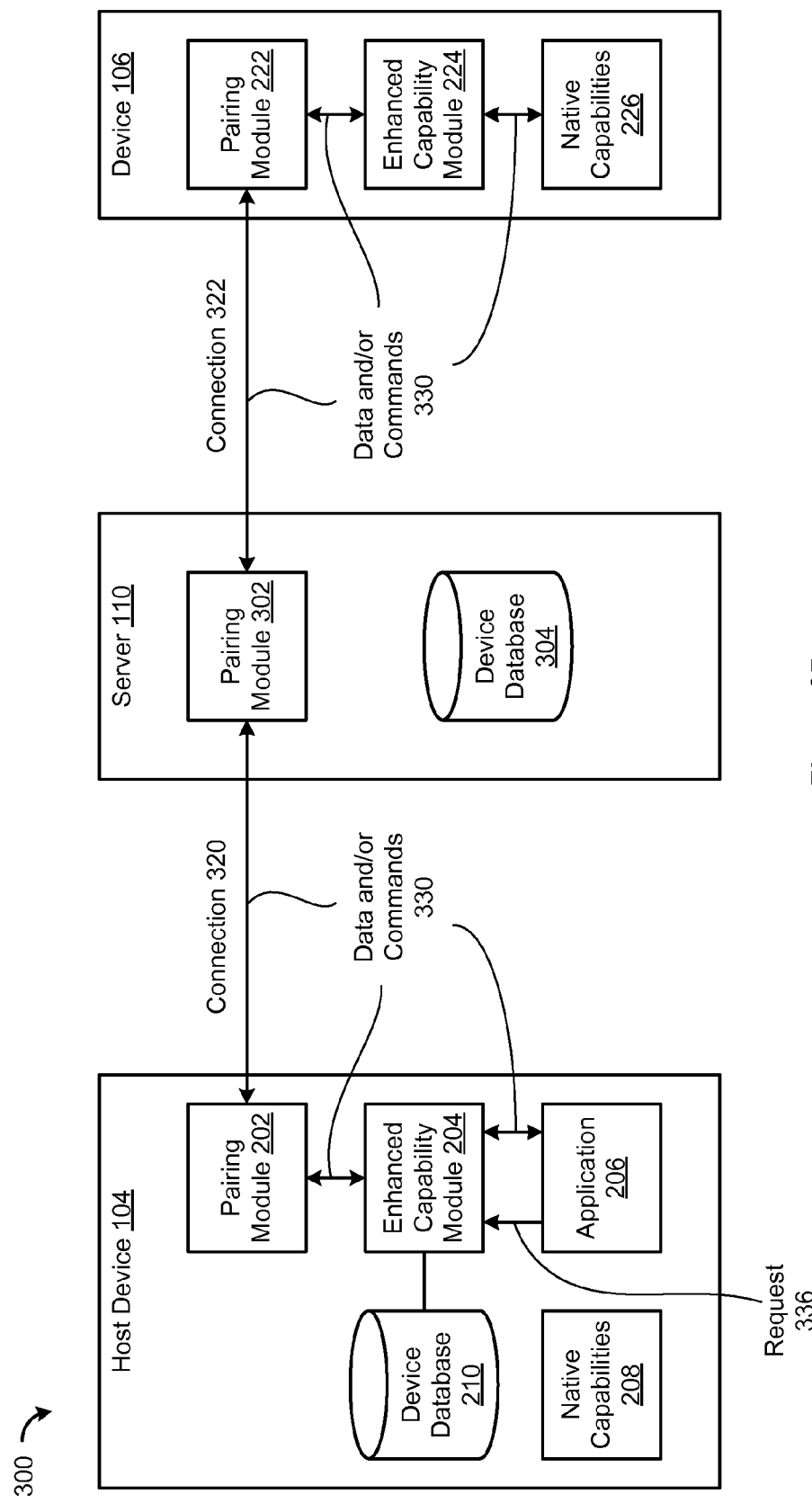
FIG. 3B is a block diagram illustrating another example process of facilitating communication between an application executing on a host device and a capability that is available on a device, according to some embodiments.

As illustrated in FIG. 3B, during execution of the application 206, the enhanced capability module 204 receives a request 336 from the application 206 requesting access to a capability that is not included in the native capabilities 208 of the host device 104. The enhanced capability module 204 queries the device database 210 to determine whether a device that is currently paired with the host device 104 includes the capability that was requested by the application 206. In this example, the enhanced capability module 204 determines that the capability requested by the application 206 is included in the native capabilities 226 of the device 106, which has been paired to the host device 104 via the server 110. Responsive to this determination, the enhanced capability module 204 issues a request to the pairing module 202 to establish a connection to the device 106 via the server 110. The pairing module 202 of the host device 104 and the pairing module 222 of the server 110 establish a connection 320 between the host device 104 and the server 110. The pairing module 302 of the server 110 and the pairing module 222 of the device 106 establish a connection 322 between the server 110 and the device 106. The connections 320 and 322 may be established using the network 120 and/or the network 121. The pairing modules 202, 302, and 222 facilitate, via the connections 320 and 322, communications of data and/or commands 330 between the enhanced capability module 204 of the host device 104 and the enhanced capability module 224 of the device 106. The application 206 uses the connections 320 and 322 to accesses the capability of the device 106 that was requested by the application 206. In doing so, the capabilities of the host device 104 are augmented with the capabilities of the device 106.

Figure 4:
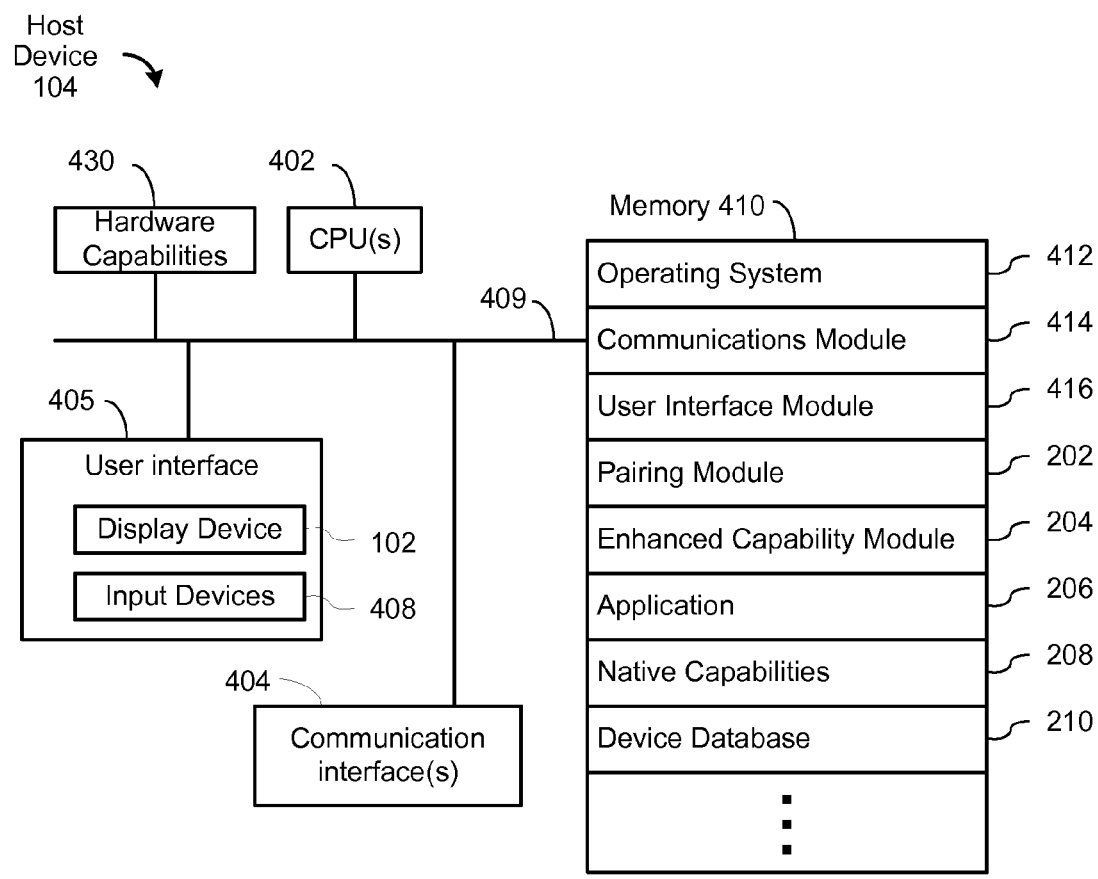
FIG. 4 is a block diagram illustrating a host device, according to some embodiments.

FIG. 4 is a block diagram illustrating the host device 104, according to some embodiments. The host device 104 typically includes one or more processing units (CPU's, sometimes called processors) 402 for executing programs (e.g., programs stored in memory 410), one or more network or other communications interfaces 404, memory 410, and one or more communication buses 409 for interconnecting these components. The communication buses 409 may include circuitry (sometimes called a chipset) that interconnects and controls communications between system components. The host device 104 includes a user interface 405 comprising the display device 102 and input devices 408 (e.g., keyboard, mouse, touch screen, keypads, etc.). The host device 104 also includes one or more hardware capabilities 430 (e.g., accelerometers, magnetometers, temperature sensors, built-in cameras, microphones, speakers, input devices, etc.). Memory 410 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 410 optionally includes one or more storage devices remotely located from the CPU(s) 402. Memory 410, or alternately the non-volatile memory device(s) within memory 410, comprises a non-transitory computer readable storage medium. In some embodiments, memory 410 or the computer readable storage medium of memory 410 stores the following programs, modules and data structures, or a subset thereof:

an operating system 412 that includes procedures for handling various basic system services and for performing hardware dependent tasks;

a communication module 414 that is used for connecting the host device 104 to other computers via the one or more communication interfaces 404 (wired or wireless) and one or more communication networks, such as the Internet, other wide area networks, local area networks, metropolitan area networks, and so on;

a user interface module 416 that receives commands from the user via the input devices 408 and generates user interface objects in the display device 406;

the pairing module 202 that handles pairing operations and facilitates communications between the host device 104 and other devices (e.g., the device 106, the server 110, etc.), as described herein;

the enhanced capability module 204 that augments the native capabilities 208 of the host device 104 so that the host device 104 can execute the applications (e.g., the application 206 that require a capability that is not included in the native capabilities 208 of the host device 104, as described herein;

the application 206 that requires a capability that is not included in the native capabilities 208 of the host device 104, but that is included in the native capabilities of another device (e.g., the native capabilities 226 of the device 106), as described herein;

the native capabilities 208 of the host device 104 (e.g., software capabilities, the hardware capabilities 430, etc.), as described herein;

the device database 210 that includes information relating to devices that are currently paired with (or have previously been paired with) the host device 104 and corresponding capabilities of the devices, as described herein.

In some embodiments, the programs or modules identified above correspond to sets of instructions for performing a function described above. The sets of instructions can be executed by one or more processors (e.g., the CPUs 402). The above identified modules or programs (i.e., sets of instructions) need not be implemented as separate software programs, procedures or modules, and thus various subsets of these programs or modules may be combined or otherwise re-arranged in various embodiments. In some embodiments, memory 410 stores a subset of the modules and data structures identified above. Furthermore, memory 410 may store additional modules and data structures not described above.

Although FIG. 4 shows a "host device," FIG. 4 is intended more as functional description of the various features which may be present in a host device than as a structural schematic of the embodiments described herein. In practice, and as recognized by those of ordinary skill in the art, items shown separately could be combined and some items could be separated.

Figure 5:
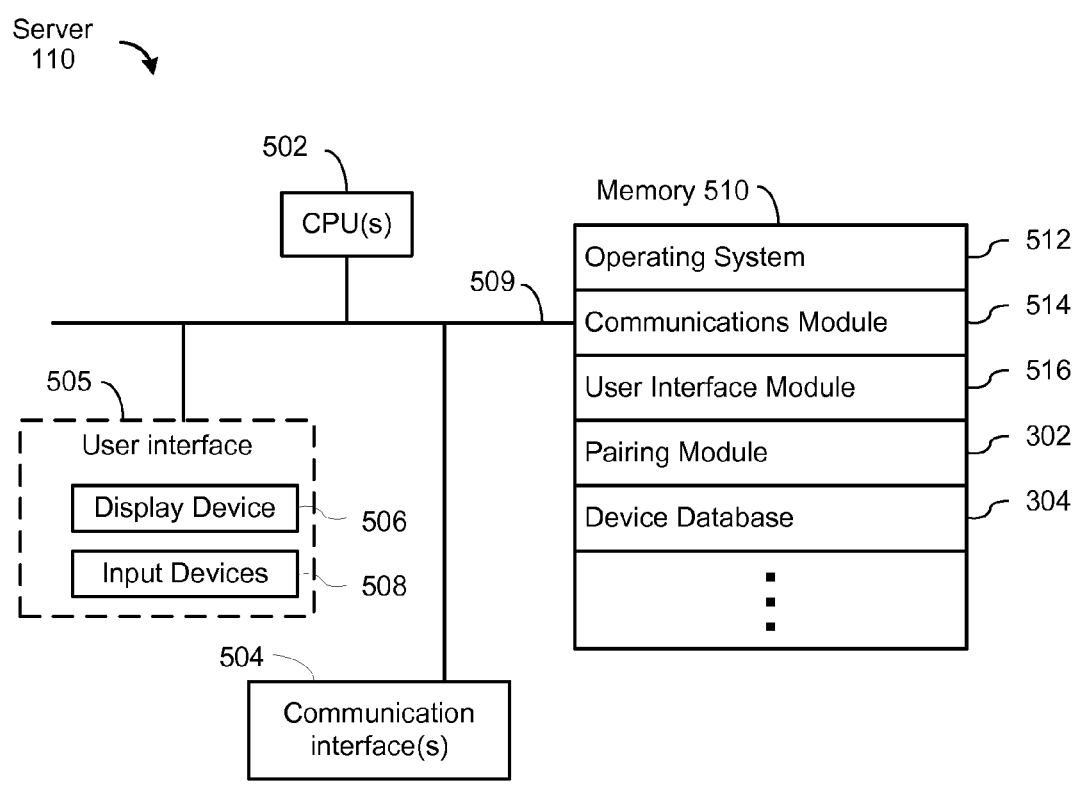
FIG. 5 is a block diagram illustrating a server, according to some embodiments.

FIG. 5 is a block diagram illustrating the server 110, according to some embodiments. The server 110 typically includes one or more processing units (CPU's, sometimes called processors) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The server 110 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some embodiments, memory 510 or the computer readable storage medium of memory 510 stores the following programs, modules and data structures, or a subset thereof:

an operating system 512 that includes procedures for handling various basic system services and for performing hardware dependent tasks;

a communication module 514 that is used for connecting the server 110 to other computers via the one or more communication interfaces 504 (wired or wireless) and one or more communication networks, such as the Internet, other wide area networks, local area networks, metropolitan area networks, and so on;

an optional user interface module 516 that receives commands from the user via the input devices 508 and generates user interface objects in the display device 506;

the pairing module 302 that facilitates pairing operations and communications between the server 110 and devices (e.g., the host device 104, the device 106), as described herein; and the device database 304 that includes information relating to devices that are currently paired with (or have previously been paired with) host devices (e.g., the host device 104) and corresponding capabilities of the devices, as described herein.

In some embodiments, the programs or modules identified above correspond to sets of instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various embodiments. In some embodiments, memory 510 stores a subset of the modules and data structures identified above. Furthermore, memory 510 may store additional modules and data structures not described above.

Although FIG. 5 shows a "server," FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a server and how features are allocated among them will vary from one embodiment to another, and may depend in part on the amount of data traffic that the system must handle during peak usage periods as well as during average usage periods.

Figure 6:
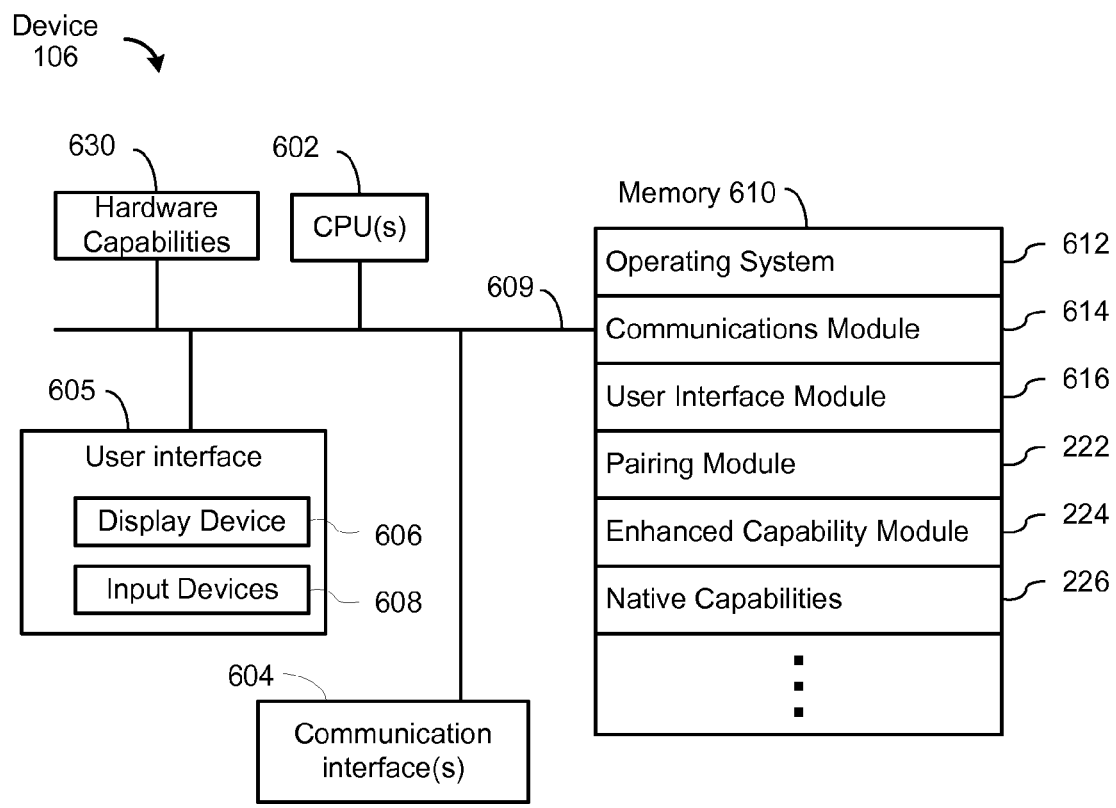
FIG. 6 is a block diagram illustrating a device, according to some embodiments.

FIG. 6 is a block diagram illustrating the device 106, according to some embodiments. The device 106 typically includes one or more processing units (CPU's, sometimes called processors) 602 for executing programs (e.g., programs stored in memory 610), one or more network or other communications interfaces 604, memory 610, and one or more communication buses 609 for interconnecting these components. The communication buses 609 may include circuitry (sometimes called a chipset) that interconnects and controls communications between system components. The device 106 includes a user interface 605 comprising a display device 606 and input devices 608 (e.g., keyboard, mouse, touch screen, keypads, etc.). The host device 104 also includes one or more hardware capabilities 630 (e.g., accelerometers, magnetometers, temperature sensors, built-in cameras, microphones, speakers, input devices, etc.). Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some embodiments, memory 610 or the computer readable storage medium of memory 610 stores the following programs, modules and data structures, or a subset thereof:

- an operating system 612 that includes procedures for handling various basic system services and for performing hardware dependent tasks;
- a communication module 614 that is used for connecting the device 106 to other computers via the one or more communication interfaces 604 (wired or wireless) and one or more communication networks, such as the Internet, other wide area networks, local area networks, metropolitan area networks, and so on;
- a user interface module 616 that receives commands from the user via the input devices 608 and generates user interface objects in the display device 606;
- the pairing module 222 that handles pairing operations and facilitates communications between the device 106 and other devices (e.g., the host device 104, the server 110, etc.), as described herein;
- the enhanced capability module 224 facilitates access by other devices (e.g., the host device 104, the server 110, etc.) to the native capabilities 226 of the device 106, as described herein; and
- the native capabilities 226 of the device 106 (e.g., software capabilities, the hardware capabilities 630, etc.), as described herein.

In some embodiments, the programs or modules identified above correspond to sets of instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various embodiments. In some embodiments, memory 610 stores a subset of the modules and data structures identified above. Furthermore, memory 610 may store additional modules and data structures not described above.

Although FIG. 6 shows a "device," FIG. 6 is intended more as functional description of the various features which may be present in a device than as a structural schematic of the embodiments described herein. In practice, and as recognized by those of ordinary skill in the art, items shown separately could be combined and some items could be separated.

Augmenting Capabilities of a Host Device

Figure 7:
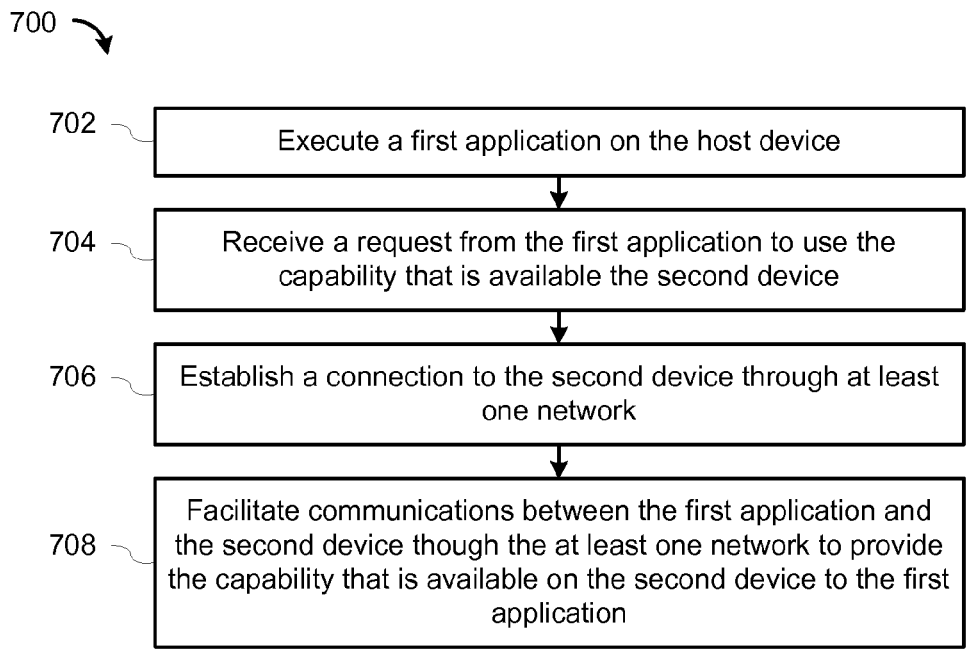
FIG. 7 is a flowchart of a method for augmenting capabilities of a host device, according to some embodiments.

FIG. 7 is a flowchart of a method 700 for augmenting capabilities of the host device 104, according to some embodiments. The host device 104 executes (702) a first application, where the first application (e.g., the application 206) is configured to execute on a second device (e.g., the device 106) and is configured to use a capability that is available on the second device, but that is not included in the host device 104. In some embodiments, the host device 104 includes a first application framework and the second device includes a second application framework, where the first application framework and the second application framework are different application frameworks. Note that an application framework provides a standard structure of an application for a specific development environment (e.g., an operating system, a web application, etc.). In some embodiments, the first application is not executed on the second device.

In some embodiments, the capability of the second device includes a functional capability selected from the group consisting of determining a location of the second device, placing a phone call, placing a video call, taking a picture, recording audio (e.g., for voice control, music recognition, etc.), recording a video, receiving input from a user (e.g., via an input device of the second device—keyboard, touchpad, etc.), receiving sensor measurements from a sensor (e.g., a gyroscope, an accelerometer, a magnetometer, a temperature sensor, a light sensor, a proximity sensor, etc.) of the second device, and sending a text message.

In some embodiments, the capability of the second device includes a hardware capability selected from the group consisting of: a satellite positioning device (e.g., a GPS receiver, etc.), a mobile telecommunications device (e.g., a cellular radio, satellite radio, etc.), a camera (e.g., a video camera, a still camera, etc.), a microphone, a speaker, a display device, and an input device (e.g., a pointing device, a keyboard, a touch screen, etc.).

The enhanced capability module 204 receives (704) a request from the first application to use the capability that is available on the second device. In some embodiments, the first application does not have knowledge of the capabilities of the second device. In other words, although the first application may be configured to execute on the second device and may require use of the capability of the second device, the capabilities of the second device is not communicated to the application itself. In fact, the first application does not have knowledge that the second device is connected to (e.g., paired with) the host device 104 and being used to provide the capability that the first application has requested from the host device 104. Stated another way, when the first application makes the request to use of the capability that is available on the second device, the first application is assuming that the host device 104 includes the capability. The enhanced capability module 204 hides the complexity of connecting to the second device to access the capability that the application is requesting.

The pairing module 202 establishes (706) a connection to the second device through at least one network. In some embodiments, when the host device and the second device are connected to a local area network (e.g., a Wi-Fi network, a Bluetooth network, etc.), the pairing module 202 establishes the connection to the second device through the local area network. In some embodiments, when the host device is connected to a first network (e.g., a local area network, etc.) and the second device is connected to a second network (e.g., a cellular network), the pairing module 202 establishes the connection to the second device through the first network and the second network.

In some embodiments, the second device is paired with the host device in response to the host device determining that the host device needs a resource that is not available at the host device. Thus, the host device does not pair with a second device until it needs additional capability. In some embodiments the second device is paired with the host device before a specific resource is requested. For example, when a new device is detected by the host device, the host device pairs with the newly detected second device before any specific resource is requested.

Figure 8:
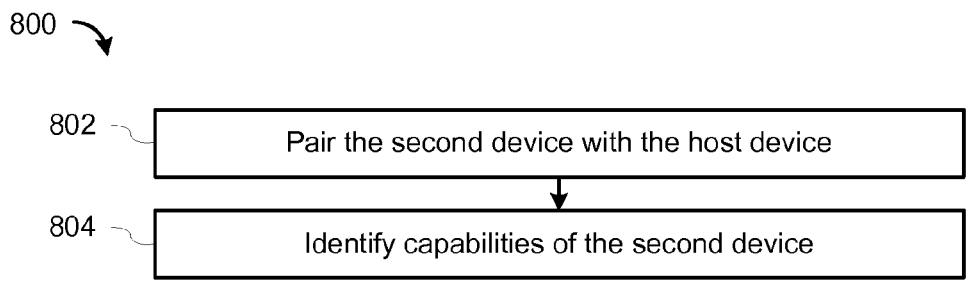
FIG. 8 is a flowchart of a method for pairing a device with a host device, according to some embodiments.

The pairing module 202 facilitates (708) communications (e.g., the data and/or commands 240, the data and/or commands 330) between the first application and the second device though the at least one network to provide the capability that is available on the second device to the first application. In some embodiments, the pairing module 202 facilitates communications between the first application and the second device though the at least one network by providing an inter-process communication channel for the host device 104 and the second device In some embodiments, prior to receiving the request from the first application to use the capability that is available on the second device, the second device is paired with the host device 104. FIG. 8 is a flowchart of a method 800 for pairing a device with a host device, according to some embodiments. The pairing module 202 pairs (802) the second device with the host device 104. The enhanced capability module 204 then identifies (804) capabilities of the second device. For example, the enhanced capability module 204 may receive information relating to the capabilities of the second device from the second device. In another example, the enhanced capability module 204 may query the device database 210 using a device identifier of the second device (e.g., a MAC address of the second device, a serial number of the second device, etc.) to obtain information relating to the capabilities of the second device.

Figure 9:
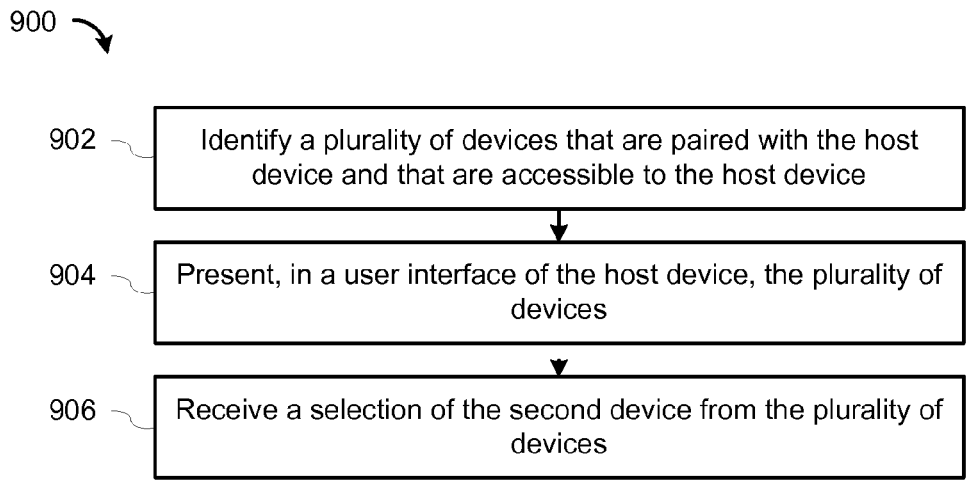
FIG. 9 is a flowchart of a method for receiving a selection of a device including a capability not included in a host device, according to some embodiments.

In some embodiments, prior to receiving the request from the first application to use the capability that is available on the second device, the enhanced capability module 204 receives a selection of a device including the capability not included in the host device 104. FIG. 9 is a flowchart of a method 900 for receiving a selection of a device including a capability not included in the host device 104, according to some embodiments. The enhanced capability module 204 identifies (902) a plurality of devices that are paired with the host device 104 and that are accessible to the host device, the plurality of devices including the second device. Note that a respective device is accessible to the host device 104 when the respective device is connected to the same network as the host device 104 (e.g., a Wi-Fi network, a Bluetooth network, etc.) and/or is connected to the host device 104 through multiple networks. The enhanced capability module 204 presents (904), in a user interface of the host device 104 (e.g., the display device 102), the plurality of devices. The enhanced capability module 204 then receives (906) a selection of the second device from the plurality of devices. For example, the selection is received from a user of the host device 104 via the input devices 408. In some embodiments, the enhanced capacity module 204 automatically suggests a second device from the plurality of devices, wherein the suggested second device is the most recently selected second device. In some embodiments, the suggested second device is determined in accordance with the specific functionality that is requested and suggesting the most recently selected second device for the specifically requested functionality. For example, the enhanced capability module 204 presents a plurality of devices with one of the devices visually highlighted. The highlighted device is the most recently selected device from the plurality of devices. Alternatively the highlighted device is the device most recently selected for the specifically requested functionality.

Note that although the discussion above refers to pairing module 202 and the enhanced capability module 204 performing the operations illustrated in FIGS. 7-9, these operations may be performed by any module (or modules) of the host device 104 (or any other computer system).

The methods illustrated in FIGS. 7-9 may be governed by instructions that are stored in a computer readable storage medium and that are executed by at least one processor of a host device. Each of the operations shown in FIGS. 7-9 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative embodiments. For purposes of explanation, numerous specific details were set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method for augmenting capabilities of a host device, performed on the host device having at least one processor and memory storing at least one first program for execution by the at least one processor of the host device to perform the method, comprising:
    determining by the host device a multimedia or sensor capability that is not available at the host device, but is offered by a plurality of computing devices, wherein each of the plurality of computing devices has at least one processor and memory storing at least one second program for execution by the at least one processor of the respective computing device to offer the multimedia or sensor capability at the respective computing device;
    pairing the host device and the plurality of computing devices via one or more networks;
    selecting a first computing device of the plurality of computing devices to implement the multimedia or sensor capability;
    in response to a request from a first application on the host device to use the multimedia or sensor capability, establishing a connection to the first computing device through the one or more networks; and
    facilitating communications between the first application and the first computing device through the one or more networks to provide an output of the multimedia or sensor capability as executed by the at least one processor of the first computing device according to the at least one second program.

2. The computer-implemented method of claim 1, wherein the host device and each of the plurality of computing devices are paired the first time the devices are connected with each other.

3. The computer-implemented method of claim 1, wherein the host device and each of the plurality of computing devices are paired and communicate with each other via a server distinct from the host device and the plurality of computing devices.

4. The computer-implemented method of claim 1, wherein facilitating communications between the first application and the first device through the one or more networks includes providing an inter-process communication channel for the host device and the first device.

5. The computer-implemented method of claim 1, wherein the host device includes a first application framework and the first device includes a second application framework, wherein the first application framework and the second application framework are different application frameworks.

6. The computer-implemented method of claim 1, wherein the host device and the first device are connected to a local area network, and wherein establishing the connection to the first device through the one or more networks includes establishing a connection to the first device through the local area network.

7. The computer-implemented method of claim 1, wherein the host device is connected to a first network and the first device is connected to a second network, and wherein establishing the connection to the first device through the one or more networks includes establishing a connection to the first device through the first network and the second network.

8. The computer-implemented method of claim 1, wherein the capability of the first device includes a functional capability selected from the group consisting of:
    determining a location of the first device;
    placing a phone call;
    placing a video call;
    taking a picture;
    recording audio;
    recording a video;
    receiving input from a user;
    receiving sensor measurements from a sensor of the first device; and
    sending a text message.

9. The computer-implemented method of claim 1, wherein the capability of the first device includes a hardware capability selected from the group consisting of:
    a satellite positioning device;
    a mobile telecommunications device;
    a camera;
    a microphone;
    a speaker;
    a display device; and
    an input device.

10. The computer-implemented method of claim 1, wherein the host device includes at least one of a television set top box and a television set.

11. The computer-implemented method of claim 1, wherein the first application is not executed on the first device.

12. The method of claim 1, further comprising:
    presenting on the host computer a user interface enabling a user to select one of the plurality of computing devices to provide the needed multimedia or sensor capability; and
    receiving a user selection of the first computing device on the user interface.

13. A system to augment capabilities of a host device, comprising:
    at least one processor;
    memory; and
    at least one first program stored in the memory and executable by the at least one processor of the host device, the at least one first program comprising instructions to:
    determine by the host device a multimedia or sensor capability that is not available at the host device, but is offered by a plurality of computing devices, wherein each of the plurality of computing devices has at least one processor and memory storing at least one second program for execution by the at least one processor of the respective computing device to offer the multimedia or sensor capability at the respective computing device;

pair the host device and the plurality of computing devices via one or more networks;

select a first computing device of the plurality of computing devices to implement the multimedia or sensor capability;

in response to a request from a first application on the host device to use the multimedia or sensor capability, establish a connection to the first computing device through the one or more networks; and facilitate communications between the first application and the first computing device through the one or more networks to provide an output of the multimedia or sensor capability as executed by the at least one processor of the first computing device according to the at least one second program.

14. The system of claim 13, wherein the host device and each of the plurality of computing devices are paired the first time the devices are connected with each other.

15. The system of claim 13, wherein the host device and each of the plurality of computing devices are paired and communicate with each other via a server distinct from the host device and the plurality of computing devices.

16. The system of claim 13, wherein the host device includes at least one of a television set top box and a television set.

17. The system of claim 13, wherein the capability of the first device includes a hardware capability selected from the group consisting of:
- a satellite positioning device;
- a mobile telecommunications device;
- a camera;
- a microphone;
- a speaker;
- a display device; and
- an input device.

18. A non-transitory computer readable storage medium storing at least one first program configured for execution by at least one processor of a computer system, the at least one first program comprising instructions to:

determine by the host device a multimedia or sensor capability that is not available at the host device, but is offered by a plurality of computing devices, wherein each of the plurality of computing devices has at least one processor and memory storing at least one second program for execution by the at least one processor of the respective computing device to offer the multimedia or sensor capability at the respective computing device;

pair the host device and the plurality of computing devices via one or more networks;

select a first computing device of the plurality of computing devices to implement the multimedia or sensor capability;

in response to a request from a first application on the host device to use the multimedia or sensor capability, establish a connection to the first computing device through the one or more networks; and facilitate communications between the first application and the first computing device through the one or more networks to provide an output of the multimedia or sensor capability as executed by the at least one processor of the first computing device according to the at least one second program.

19. The non-transitory computer readable storage medium of claim 18, wherein the host device and each of the plurality of computing devices are paired and communicate with each other via a server distinct from the host device and the plurality of computing devices.

20. The non-transitory computer readable storage medium of claim 18, wherein the capability of the first device includes a functional capability selected from the group consisting of:
- determining a location of the first device;
- placing a phone call;
- placing a video call;
- taking a picture;
- recording audio;
- recording a video;
- receiving input from a user;
- receiving sensor measurements from a sensor of the first device; and
- sending a text message.

* * * * *